United States Patent

[11] 3,556,027

[72] Inventor William L. Ammann
Argonia, Kans. 67004
[21] Appl. No. 711,782
[22] Filed Mar. 8, 1968
Division of Ser. No. 566,996, July 21, 1966, Patent No. 3,372,658.
[45] Patented Jan. 19, 1971

[54] SOIL TREATMENT WITH LIQUID ANHYDROUS AMMONIA
3 Claims, 11 Drawing Figs.
[52] U.S. Cl. .................................................. 111/1, 111/7
[51] Int. Cl. ................................................... A01c 23/02
[50] Field of Search ......................................... 111/6—7,1

[56] References Cited
UNITED STATES PATENTS
| | | | |
|---|---|---|---|
| 2,637,979 | 5/1953 | Pool et al. | 111/7X |
| 2,691,358 | 12/1954 | Peck | 111/7 |
| 2,784,530 | 3/1957 | Dugan | 111/7X |
| 3,139,848 | 7/1964 | Welty | 111/7 |
| 3,174,446 | 3/1965 | Clarke et al. | 111/7 |

Primary Examiner—Robert E. Bagwill
Attorney—Robert E. Breidenthal

ABSTRACT: A method of subsurface injection of anhydrous ammonia fertilizer wherein liquid is conducted from a source of liquid ammonia traversed over a field to a subsurface injection unit from which the ammonia is discharged, with the ammonia being maintained under a sufficient pressure throughout substantially its entire travel to the injector unit to hold the same substantially entirely in its liquid state during such travel. Such method of injection substantially reduces the eventual evaporation of the ammonia from producing a refrigerating effect upon injection apparatus, and by primarily restricting any refrigerating effect to the subsoil the possibility of loss of ammonia to the atmosphere is further reduced. Apparatus suitable for the practice of the method includes a plurality of spaced injector units connected by individual conduits to a manifold, such manifold having communication with the liquid contents of a supply vessel by way of a single conduit provided with a pressure regulator, filter and shutoff valve. Each of the individual conduits is provided immediately adjacent its respective injector unit with a control valve which is normally closed, the arrangement being such that ammonia is supplied to the individual control valves as a liquid under a regulated pressure that is sufficient to maintain the same in a liquid state. Each of the control valves is provided with fluid pressure actuated means for opening such valves, and all of such means are connected by a common conduit to a master control valve, and the latter is such that the common conduit can be selectively vented and placed in communication with a source of fluid pressure, which can be the vapor space at the top of the ammonia storage vessel.

FIG. 1

INVENTOR.
WILLIAM L. AMMANN
BY
Robert E Breidenthal
ATTORNEY

INVENTOR.
WILLIAM L. AMMANN
BY
Robert E. Breidenthal
ATTORNEY

SOIL TREATMENT WITH LIQUID ANHYDROUS AMMONIA

This is a division of my copending original application Ser. No. 566,996, entitled Soil Treating Apparatus, filed Jul. 21, 1966 and which original application will issue Mar. 12, 1968 as U.S. Pat. No. 3,372,658.

The present invention relates to new and useful improvements in agricultural apparatus for subsurface injection of soil treating fluids, and more particularly pertains to apparatus for injecting treating fluids that include a volatile substance (such as ammonia, butane, etc.) carried in the liquid state by the apparatus.

At the present time, soil fertilization or treatment is being conducted on a major scale by the subsurface injection of anyhdrous ammonia. Apparatus used for this purpose conventionally includes a vehicle for traversing the field, a pressure vessel on the vehicle for containing anhydrous ammonia in the liquid state and from which ammonia is conducted by a plurality of conduits to an equal number of ground penetrating injector units that discharge the ammonia as the vehicle travels along. An injector unit is usually in the form of a blade adapted to project below the surface of the ground and to cut through the ground as the vehicle advances (with perhaps as assist insofar as cutting is concerned by such blade being arranged to trail a ground penetrating colter wheel), such blade incorporating or having attached thereto an end portion of the ammonia conduit, and the latter having a discharge opening at a position to discharge ammonia beneath the ground surface when the blade is in ground penetrating position. Conventional apparatus may optionally also include means such as a roller or chain trailing each injector unit to fill or close, at least to some extent, such cut or furrow that may remain open after the passage of the blade of the injector.

Exemplary of prior art proposals as to apparatus such as discussed briefly above (some of which have to some extent had features thereof carried into actual practice) may be mentioned the disclosures of the following listed U.S. Pat.:

2888891—Liquid Fertilizer Attachment, June 2, 1959, Ackley.
2973728—Anhydrous Ammonia Metering Dispenser, March 7, 1961, Garretson.
2781733—Apparatus for Dispensing Material Beneath the Shank of a Ground-Working Tool, February 19, 1957, Graham.
2415251—Soil Treating Process, February 4, 1947, Leavitt.
2691358—Fertilizer Flow Controller, October 12, 1954, Peck.
2782739—Distribution of Fluids, February 26, 1957, Freer.
3139848—Fluid Distribution, July 7, 1964, Welty.
2637979—Dispensing Tank and Valve Structure, May 12, 1953, Pool et al.
3148642—Soil Treating Apparatus, September 15, 1964, Gould.
3012526—Method of Injecting Liquids into the Soil, December 12, 1961, Baldwin et al.
2912944—November 17, 1959, Snow et al.

The above listed U.S. Pats. set forth quite clearly the objects and advantages of such systems for soil treatment, and also disclose quite well the general principles of structure and function of such apparatus. Since the objects, advantages and principles of structure and function of apparatus (and processes performed in the use of such apparatus) such as disclosed in the above patents are well known to those skilled in the art, there is no need to repeat or discuss such disclosures herein insofar as those familiar with the art are concerned, it being understood that such disclosures are incorporated herein by reference with it being left to those less familiar with the art to consult such of the above listed and generally available patents as may be necessary for edification about the subject.

The present trend of the art is to include with ammonia other treating agents such as sulfur, and in such instances the ammonia not only serves as a fertilizer that is injected with a pressure developed from its own volatility or vapor pressure, but additionally serves what might be termed the functions of carrier and propellant for other treating agents that might be dissolved, emulsified or dispersed as a suspension in the liquid ammonia. Apparatus of the same general character can be employed for injecting volatile substances other than ammonia, such other volatile substances being an active soil treating agent and/or a carrier and propellant. For example, such other volatile substance can be liquified petroleum gas (propane and/or butane, and the like).

Whatever the character of the liquified volatile substance and regardless of whether such substance is in admixture with other materials, prior art devices and proposals for injection such substance as a vapor in the ground are subject to certain shortcomings. Among many such shortcomings may be mentioned such as vaporization occuring in such a manner or at such a position as to cause an intolerable accumulation of frozen earth on the injector by reason of the vaporization; deposit of residues (such as sulfur) from an ammonia carrier such as to obstruct and greatly attenuate subsequent flow of ammonia; a lack of uniformity or rates of injection as between various injectors; and a great waste of ammonia on attempting to make a turnaround at the end of the field being treated by reason of valving being at a position in the distribution conduits remote from the injectors and the consequent loss of fluids in the portions of the conduits intermediate the valves and the injectors.

It is a primary object of the present invention to provide apparatus that will overcome or greatly minimize each and every one of the difficulties mentioned in the preceding paragraph.

Another important object of the present invention is to produce apparatus of the character specified above such that will enable adjustment of the rates of insertion of treating fluids for each of the individual injectors, whereby variations in concentration of treating agents may be obtained, and uniformity between the various injectors also obtained.

Yet another object of the present invention is to provide apparatus of the character specified above which will be simple and reliable in operation, and which will also be economical in manufacture as well as durable in use.

Still another object of the invention is to provide individual valves for each of the injectors, such valves being positioned in the immediate proximity of such injectors, together with means for actuating such valves in unison from a remote position.

An extremely important aspect of the invention involves, in the method of soil treatment, wherein a treating unit is caused to traverse a field, such treating unit including a vessel for containing liquid anhydrous ammonia and a soil penetrating injector with a conduit connecting the vessel and the injector, and wherein ammonia is passed from the vessel into the conduit, passed through the latter conduits; thence through the injector and is discharged from the injector beneath the surface of the soil; the improvement in such method comprising introducing the ammonia into the conduit from the vessel in its liquid state, and thereafter maintaining the ammonia under a pressure along its passage sufficient to prevent vaporization of more than a minor fraction thereof prior to discharge thereof from the injector, whereby most of the ammonia vaporizes subsequent to its discharge from the injector.

Another important aspect of the invention involves, in agricultural apparatus of the type including a plurality of ground penetrating injectors for subsurface injection of soil treating fluids, such injectors being connected by individual conduits to a common source of supply of soil treating fluids, with valve means being provided to shut off fluid communication between the injectors and the source of supply through said conduits, the improvement wherein said valve means comprises an individual shutoff valve in each of the individual conduits with each of such valves being disposed in its respective conduit at a position therealong substantially spaced from the common source and means including a single control for actuating all said valves in unison, whereby all fluid communication between the injectors and the source as well as the portions of the conduits between the source and the valves can be shutoff.

Still another important aspect of the invention has to do with a pressure controlled valve comprising a valve body having a generally L-shaped fluid passageway therethrough that is partially defined by an annular valve seat, said body being provided with a cylindrical bore in axial alignment with the valve seat and having an inner end spaced from the passageway, said body having a cylindrical opening therein in axial alignment with the bore and the valve seat and extending from the inner end of the bore to the passageway, a piston slidable in the bore to define a sealed chamber in the bore intermediate the inner end of the latter and the piston, a valve stem fixed to the piston to project toward the valve seat, said valve stem slidably and sealingly extending through said opening, said valve stem being provided with a valving element at its end remote from the piston, said valving element being sealingly engageable with the valve seat to close the passageway on movement of the piston toward the inner end of the bore, said valving element including a tapered portion projecting into the valve seat, said valving element and the valve seat being so constructed and arranged that the passageway is progressively opened as the valving element is moved from sealing engagement with the valve seat on movement of the piston from the inner end of the bore, a control fluid passageway in the valve body communicating with the chamber whereby a fluid pressure can be applied to move the piston from the inner end of the bore, a plate mounted on the body at the outer end of the bore, a compression spring in the bore biased between the plate and the piston for yieldingly urging the piston toward the inner end of the bore, said plate having a threaded opening therethrough, and a stop member threadingly extending through the threaded opening and into the travel path of the piston, whereby a fine adjustment can be made as to the limit of movement of the piston from the inner end of the bore and equally fine adjustment obtained as to the maximum opening of the L-shaped passageway.

Yet another important aspect of the invention involves, for use in a fluid pressure controlled system of the type including conduit means for controlled fluid pressure, the improvement comprising first and second shutoff valves each operatively connected to said conduit means for continuous fluid communication therewith, said first valve being connected to a source of pressurized fluid whereby opening of the first valve admits fluid under pressure to the conduit means, said second valve being in communication with ambient atmosphere whereby opening of the second valve vents the conduit means to atmosphere, means operatively interconnecting said and second valves for alternate closure of said first and second valves, said first and second valves each including an actuating valve stem, with said valve stems being parallel to each other and having free ends, said means for alternate closure of said valves comprising a pair of cam wheels mounted to rotate in unison about a common axis, said cam wheels being in operative engagement with the free ends of the valve stems in an arrangement such that each successive advance in rotation of the cam wheels by a predetermined angular amount reverses both the first and second valves to open one and close the other, and rachet means responsive to each successive actuation thereof to advance the cam wheels angularly by said predetermined amount.

A very important feature of the invention resides in valving the flow of volatile treating agent to each injector at a position in very close proximity to the injector, and having a reduced discharge orifice for the injector such that relatively little vaporization of the volatile treating agent will occur in the injector with the desirable result of minimization of refrigeration effect that would otherwise cause an accumulation of frozen and adhering earth about the injector.

Another important feature of the invention resides in the provision of individual valves for the individual injectors, each of such valves being provided with micrometer-type adjustments so as to equalize the flow of the injectors at any desired rate of discharge.

Another very important feature of the invention resides in the provision of control means remote from the injectors which will operate the individual valves in unison.

These, and other objects, and features of the invention will become apparent as the following description of a preferred embodiment of the invention proceeds, such description to be taken in conjunction with the accompanying drawings, wherein:

FIG. 8 is an elevational view of a filter provided in the main distribution line;

FIG. 9 is a central sectional view of the structure shown in FIG. 8;

FIG. 10 is an enlarged detail sectional view of one of the injector units taken upon the plane of the section line 10—10 in FIG. 11; and, FIG. 11 is a broken diagrammatic view of the system of the present invention.

Figure 1:
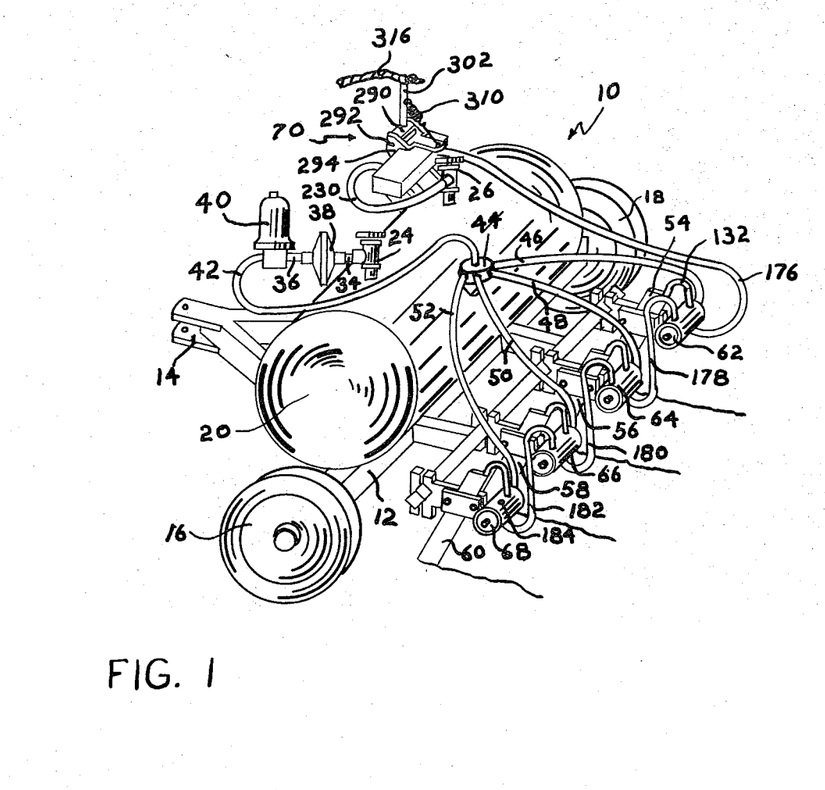
FIG. 1 is a perspective view of apparatus according to the invention.

Referring now to the accompanying drawings wherein like numerals designate like parts throughout the various views, the reference numeral 10 designates generally apparatus according to the present invention, such agricultural apparatus 10 comprising a wheel mounted vehicular frame 12 provided with a tow tongue 14 by means of which the apparatus 10 can be traversed over fields undergoing treatment. The vehicular frame 12 which is supported by ground wheels 16 and 18 has mounted thereon a vessel 20 suitable for containing under superatmospheric pressure a liquified volatile substance such as liquified ammonia 22 (see FIG. 11).

Figures 8, 9, 10, 11:
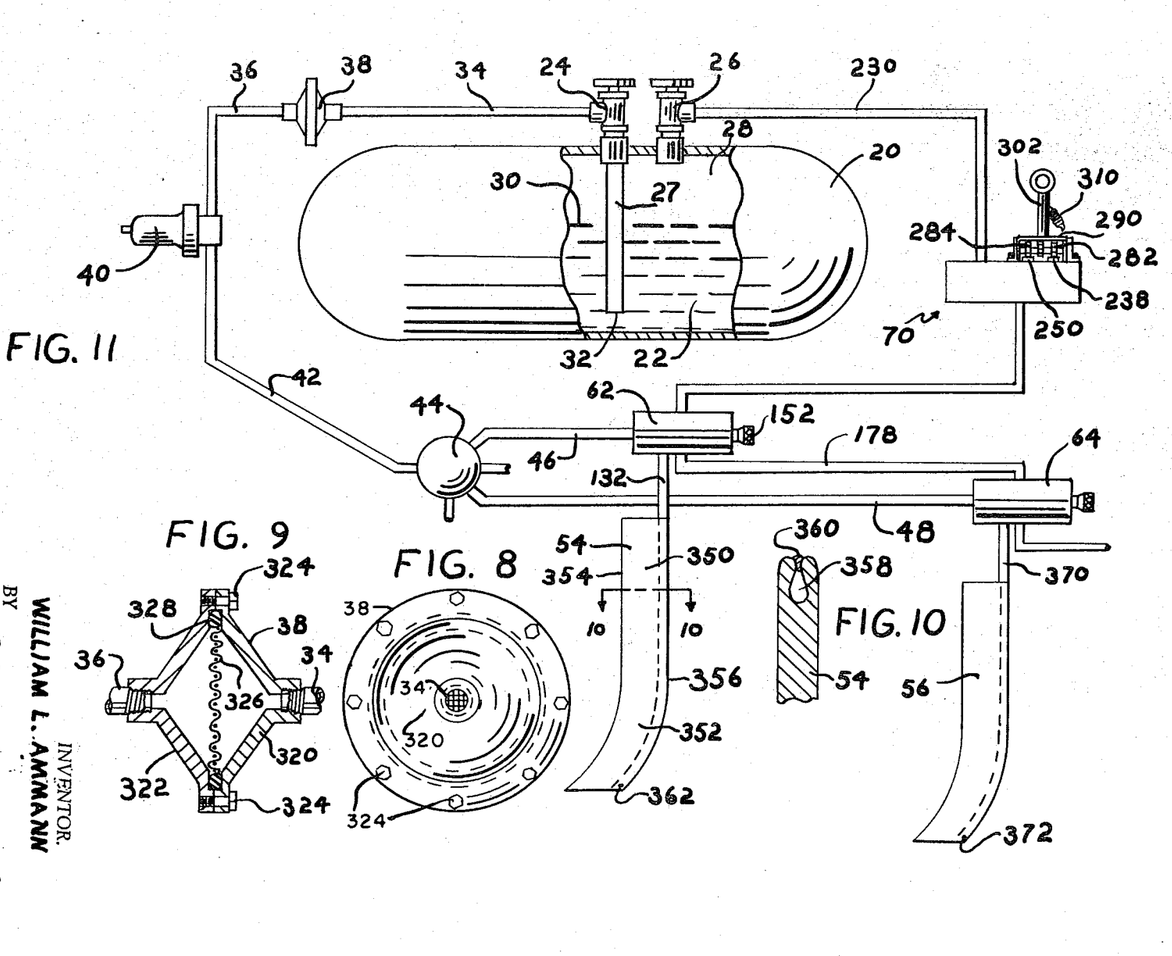

A pair of shutoff valves 24 and 26 are mounted upon the top of the vessel 20 so as to communicate with the interior of the vessel 20, and the valve 24 is provided with an inlet pipe 27 projecting downwardly within the interior of the vessel 20 through a vapor space 28, the surface 30 of the ammonia and downwardly through the liquified ammonia 22 to a position 32 closely spaced to the bottom of the interior of the vessel 20. The arrangement is such that liquid ammonia 22 will enter the lower end 32 of the pipe or conduit 27 and be conducted to a conduit 34 when the valve 24 is open, it being understood that the liquified ammonia 22 will, by virtue of its volatility and high vapor pressure, generate a superatmospheric pressure within the vessel 20 under temperature conditions prevailing in the area of use of the apparatus 10. The valve 24 is fully opened during use of the apparatus 10, and is preferably closed at such times as the apparatus 10 is not to be used.

The line or conduit 34 communicates with a further line or conduit 36 via a filter 38 (described in greater detail subsequently), and the line or conduit 36 communicates with the inlet of a pressure regulator 40, the latter having its outlet connected to a line or conduit 42. The pressure regulator 40 can conveniently be such as that marketed by Fisher Governor Company of Marshal Town, Iowa, as their Model No. 95 H. The pressure regulator 40 is preferably adjusted to produce a constant discharge pressure within the outlet line or conduit 42 thereof that is substantially in excess of the pressure that might result in appreciable vaporization of ammonia. For example, the pressure regulator 40 can be adjusted to regulate the pressure in the line 42 to be 35 p.s.i.g. or greater.

The line or conduit 42 has its outlet end connected to a manifold 44 which in turn is connected to the inlets of a plurality of conduits 46, 48, 50 and 52, it being understood that the manifold 44 simply affords continuous fluid communication between the conduit 42 and all the conduits 46 through 52, and enables some saving in the total amount of conduit that would otherwise be necessary to connect all the conduits 46 through 52 to the outlet of the pressure regulator 40. Actually such saving in conduit will ordinarily substantially exceed that which might be apparent on inspection of FIG. 1, inasmuch as FIG. 1 shows only four injector units, whereas the apparatus 10 will normally include a substantially greater number of injector units, only four of such units being shown in the drawings as illustration of a greater number would serve no useful purpose and would tend to obscure the actual invention.

The injector units referred to in the preceding paragraph are designated by the reference numerals 54, 56, 58 and 60, such units being respectively connected via valves 62, 64, 66 and 68 to the distribution lines or conduits 46, 48, 50 and 52. As will be seen presently, the valves 62, 64, 66 and 68 are actuated in unison by a combined pressure regulator and pressure fluid control system indicated generally at 70.

As will be explained in greater detail subsequently, it will suffice for the present to understand that the injectors 54 through 60 each are comprised of a combined earth penetrating blade and conduit and that such injectors discharge from adjacent their lower ends ammonia at rates subject to the control of the valves 62 through 68, respectively.

Figure 2:
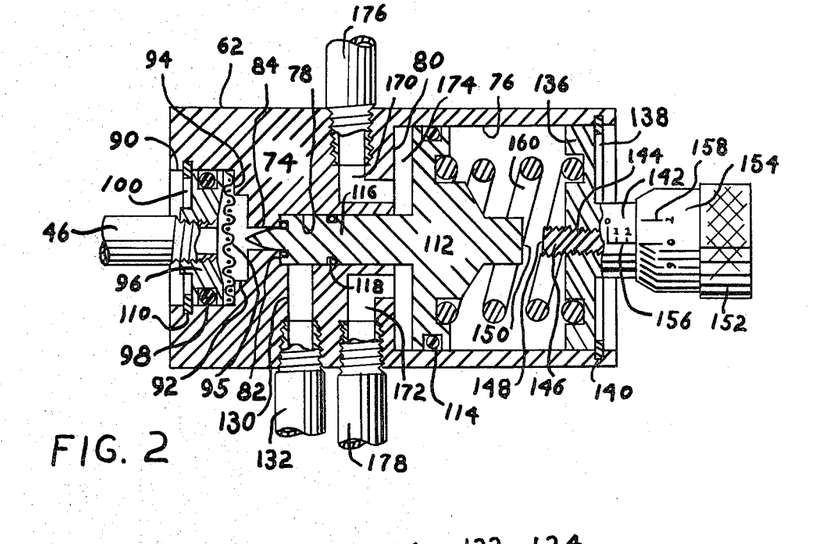
FIG. 2 is an enlarged central sectional view of one of the valve units.
Figure 3:
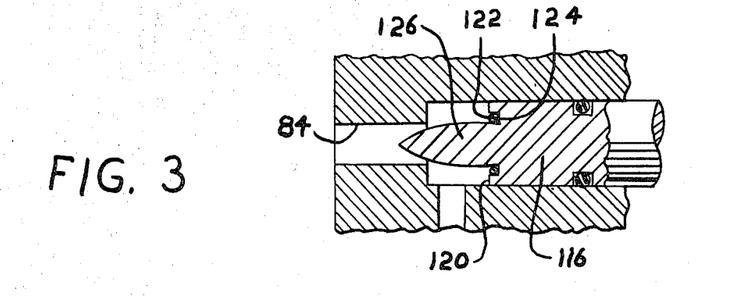
FIG. 3 is an enlarged fragmentary detail view of one of the valving elements and its associated valve seat, this view showing the valving element in an open position.
Figure 4:
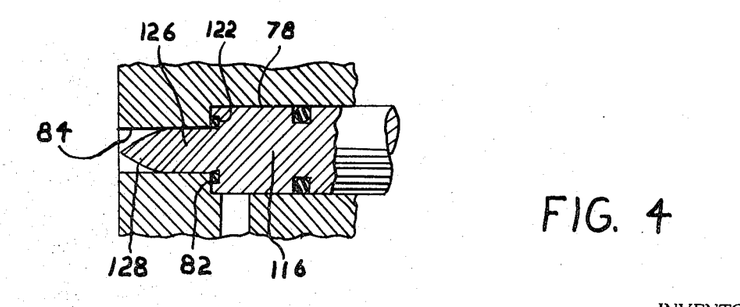
FIG. 4 is a view similar to FIG. 3, but showing the valving element in valve closing position.

Inasmuch as each of the valves 62 through 68 is identical, a detailed description of one of such valves will suffice for all, and accordingly, attention is directed to FIGS. 2, 3 and 4 wherein the valve 62 is illustrated in detail. The valve 62 comprises a valve body 74 having an enlarged bore 76 in one end thereof, and such cylindrical bore 76 is in axial alignment with a smaller cylindrical opening 78 that terminates at its end remote from the inner end 80 of the bore 76 at an annular valve seat 82 defined at the juncture of the opening 78 with a yet smaller and axially aligned opening 84.

The end of the valve body 74 remote from the outer end of the bore 76 is provided with a cylindrical recess 90 that is in axial alignment with the bore 76, the opening 78, the valve seat 82 and the opening 74. The recess 90 has communication with the opening 84 by means of an opening 92 coaxial with the opening 84 and having a diameter intermediate that of the opening 84 and the recess 90. The arrangement is such that a shoulder 94 is defined at the juncture of the recess 90 and the opening 92, and a filter screen 95 is disposed within the recess 90 and seated against such annular shoulder 94. An annular coupling member 96 is disposed within the recess 90 and has sealing engagement with the lateral confines of the latter by means of an O-ring seal 98 provided in the periphery of the annular coupling member 96. The coupling member 96 is retained in the recess 90 in a position abutting the screen 95 by means of a conventional C-shaped retaining ring of resilient character that is removably received within an annular groove 110. The member 96 is internally threaded as shown, and the conduit 46 has a threaded end threadingly fitted into the annular coupling member 96, as clearly shown.

A piston 112 is slidingly and sealingly fitted within the bore 76, an O-ring seal 114 being provided about the periphery of the piston 112 to assure such seal. Fixed to and preferably integral with the piston 112 is a valve stem 116 that is slidingly and sealingly extended through the opening 78 toward the annular valve seat 82 as shown, and in order to assure a fluid-tight seal between the valve stem 116 and the sides of the opening 78, an O-ring 118 is preferably provided about the valve stem 116, as shown. The end of the valve stem 116 remote from the piston 112 constitutes a valving element comprised of an annular shoulder 120 in which an O-ring seal 122 is seated within an annular groove 124 provided therefor. As clearly shown in FIG. 4, movement of the valve stem 116 to the left in the opening 78 serves to seat the O-ring 122 against the annular valve seat 82 to positively prevent any flow of fluid through the cylindrical opening 84. The valving element also includes a reduced end portion 126 of circular transverse section that is tapered in diameter from the valve stem 116 as indicated at 128. Preferably, such taper 128 progressively increases from the valve stem 116; however, the taper 128 can be linear, if desired. In the preferred construction, the projection 126 has a diameter at its major end substantially equal to the internal diameter of the opening 82, and thus augments the sealing effect obtained by the O-ring 122. A lateral opening 130 is provided which communicates between the opening 78 and the exterior of the valve body 74, and such opening 130 is internally threaded for threaded connection to a conduit 132, such conduit 132 being connected to the injector 54 as shown in FIGS. 1 and 11.

From the foregoing, it will be seen that the openings 84 and 130 together with a portion of the extent of the opening 78 constitutes an L-shaped passageway through the valve 62 and a path of communication between the conduits 46 and 132 that is controlled by the valving element comprised of the sealing ring 122 and the tapered projection 126 that projects into the opening 84. The arrangement is such that when the valve stem 116 is in the position shown in FIG. 4, the valve 62 is closed so as to shutoff entirely fluid communication between the conduits 46 and 132, with such fluid communication becoming increased progressively upon movement of the valve stem 116 to the right as viewed in FIGS. 3 and 4. In other words, a very short or small degree of movement of the valve stem 116 to the right will permit for a given pressure differential a very small flow of fluid between the conduits 46 and 132, and for such given pressure differential progressively moving the valve stem 116 to the right will result in a progressively increasing rate of flow as between the conduits 46 and 132. Thus, the degree of valve opening or fluid communication between the conduits 46 and 132 is a function of the extent to which the valve stem 116 and the piston 112 are moved to the right as seen in FIGS. 2, 3 and 4.

Adjustable means is provided for positively limiting the extent to which the valve stem 116 and the piston 112 can be moved to the right, and for an appreciation of such means, attention is directed to FIG. 2, wherein it will be seen that a circular plate 136 is received within the outer end of the bore 76, and it should be noted that while the plate 136 fits fairly snuggly within the bore 76 it is not necessary, and in fact it is preferred that such contact not be fluid tight. The plate 136 is secured against outward movement from within the bore 76 by means of a resilient C-shaped retaining spring 138 that is removably seated within an annular groove 140 as shown. The plate 136 is provided with a central integral boss 142 that extends outwardly from the confines of the bore 76, and the plate 136 and its integral boss 142 are provided with an axially extending internally threaded opening 144 therethrough. A threaded stop member 146 is threaded through the opening 144 to project the piston 112 from the plate 136. The inner end 148 of the stop member 146 is disposed directly in the travel path of a central boss 150 carried by the piston 112, the arrangement being such that movement of the valve stem 116 to the right as shown in FIG. 2 is positively limited to such a position in which the boss 150 of the piston 112 abuts the inner end 148 of the stop member 146. Such limiting position is of course adjustable by means of threading the stop member 146 through the plate 136 towards and away from the piston 112. In order to calibrate and precisely adjust the axial position of the stop member 146, the outer end of the stop member 146 is enlarged to constitute a knurled turning knob 152, and the turning knob 152 is provided with a sleeve or skirt 154 that extends toward the plate 136 and which rotatably embraces the boss 142. The boss is provided with axially extending indicia 156, and the sleeve 154 is provided with circumferentially extending indicia 158 in an arrangement such that the extent of exposure of the axial indicia 156 by the sleeve 154 taken in conjunction with the relationship of the indicia 158 as to its angular position with respect to the indicia 156 enables the position of the stop member 146 to be accurately indicated.

A coiled compression spring 160 is disposed within the bore 76 and biased between the piston 112 and the plate 136 so as to resiliently and yieldingly urge the valve stem 116 to the left as seen in FIGS. 2, 3 and 4, whereby the valve 62 is normally fully closed.

Pressure responsive means is provided for opening the valve 62 to the extent that such opening is limited by the stop member 146, such means comprising the provision of passageways 170 and 172 in the valve body 74 which communicate between an annular chamber 174 within the bore 76 and the exterior of the valve body 62, such passageways 170 and 172 being respectively coupled by threaded connection to conduits 176 and 178. It will be evident upon inspection of FIG. 2 that whenever a pressure of sufficient magnitude prevails within the conduits 176 and 178, such pressure is communicated to the chamber 174 and therein acts upon the piston 112 to move such piston and the valve stem 116 to the right against the bias of the spring 160 until further movement is prevented by the stop member 146. It is to be noted that the pressure prevailing within the conduit 176 is communicated to the conduit 178 via the passageway 170, the chamber 174, and the passageway 172. The importance of the latter consideration resides in the fact that providing each valve with two passageways or ports communicating with the piston chamber enables a plurality of valves to be connected in series to a source of fluid pressure with a plug provided in one of the ports of the last valve of the series with the result of pressure applied from a single conduit serving to actuate the pistons of all the valves in unison and therefore open all the valves at one time, and similarly release of pressure from any one of such chambers results in venting the system and consequent closure in unison of all the valves by the action of the springs therein. Such arrangement is exemplified in FIGS. 1 and 11 wherein the conduit 176 constitutes a line by means of which pressure is applied or vented from the piston chambers of all the valves 62 through 68, and such series connection of the valves is comprised of the conduit 178 connected between the valves 62 and 64, a conduit 180 connected between the valve 64 and 66, and a conduit 182 connected between the valves 66 and 68. Since valve 68 is the last in the series of valves, a plug 184 is provided to close one of the two ports communicating with the piston chamber therein.

It will be apparent from the foregoing that under static conditions, the pressures prevailing within all the piston chambers 174 of all the valves 62 through 68 are identical or of the same value by virtue of the connecting conduits 178, 180 and 182, and such pressure is equal to that prevailing within the conduit 176.

Means is provided for controlling the pressure prevailing within the conduit 176 and therefore additionally controlling whether the valves 62 through 68 are open or closed. Such means comprises the previously mentioned combined pressure regulator and control valve means 70. The combined pressure regulator and control valve means is illustrated in detail in FIGS. 5, 6 and 7, wherein the reference numeral 200 designates a valve body provided with passageways 202 and 204 with valve means controlling fluid communication between such passageways, such valve means comprising an annular valve seat 206 at the juncture of such passageways and a valving element 208 movable to cooperate with the annular valve seat for regulating the degree of communication between the passageways 202 and 204. Means responsive to the pressure prevailing within the passageway 204 in relation to ambient atmospheric pressure is provided for controlling movement of the valving element 208, such latter means comprising the body 200 having a piston chamber 210 therein in which is slidingly and sealingly disposed a piston 212. The piston is provided with an integral valve stem 214 that is in turn connected to the previously mentioned valving element 208. The valve stem 214 is sealingly slidable through an opening 216 in the body 200 that communicates between the passageway 204 and the piston chamber 210. The passageway 204 includes a lateral branch 218 that communicates with the piston chamber 210 on the side of the piston remote from the valve stem 214, in an arrangement such that pressure prevailing in the passageway 204 and its branch 218 is applied against the piston 212 so as to urge the piston 212 and the valve stem 214 to the left and towards closing position of the valving element 208. Such movement of the piston 214 by fluid pressure within the passageway 218 is yieldingly opposed by a coiled compression spring 220 as will be apparent on inspection of FIG. 5. The piston chamber 210 is vented to atmosphere by an opening 222 at a position such that the net force exerted by fluid pressures against the piston 212 is a function of the diameters of the piston 212 and the valve stem 214, as will be appreciated. The strength of the spring 220 is such in relation to the geometry of the piston 212 and the valve stem 214 that the valve element 208 will tend to close or seat against the valve seat 206 whenever the pressure within the passageway 204 exceeds a predetermined pressure, which can conveniently be approximately 40 p.s.i. pressure. The force exerted against the end of the valve stem 214 directly by pressure prevailing within the passageway 202 is relatively immaterial because of the small area of exposure, as will be appreciated.

In view of the foregoing, the pressure prevailing within the passageway 204 is substantially of a predetermined value, it being assumed that pressure prevailing within a conduit 230 and coupled to the passageway 202 is in excess of such predetermined value. The conduit 230 is in fact as will be seen on inspection of FIGS. 1 and 11, connected to the shutoff valve 26 so as to be in communication with the pressurized vapor space 28 in the upper portion of the interior of the vessel 20.

The regulated pressure of passageway 204 is communicated by a lateral passageway 232 to a valve structure comprising an annular valve seat 234 that is operatively associated with a valving element 236 carried by a valve stem 238. The valve stem 238 is slidingly and sealingly reciprocable within a cylindrical chamber 240 and is movable from a position such as to close (see FIG. 6) the passageway 232 to a position opening such passageway (see FIG. 5) to the interior of the chamber 240. The valve element 236 and the valve stem 238 are yieldingly urged to the open position shown in FIG. 5 by a coiled compression spring 242 disposed within the chamber 240.

The chamber 240 is in continuous communication with the previously mentioned conduit 176 by means of a passageway 250. Thus, when the valve stem 238 is in the position shown thereof in FIG. 5, regulated fluid pressure is admitted to the conduit 176 from the vapor space 28 at the top of the vessel 20. The body 200 is provided with a second valve structure which includes an annular valve seat 252 and a valving element 254 carried at one end of a valve stem 256 sealingly reciprocable within a cylindrical chamber 258 in the valve body 200. The chamber 258 has direct communication, when the valve stem 256 is in the position shown thereof in FIG. 6, with the interior of the conduit 176 by way of a passageway 260 that merges with the passageway 250 within the body 200. The chamber 258 is vented to atmosphere by way of an opening 262 as clearly shown in the drawings.

Figures 5, 6, 7:
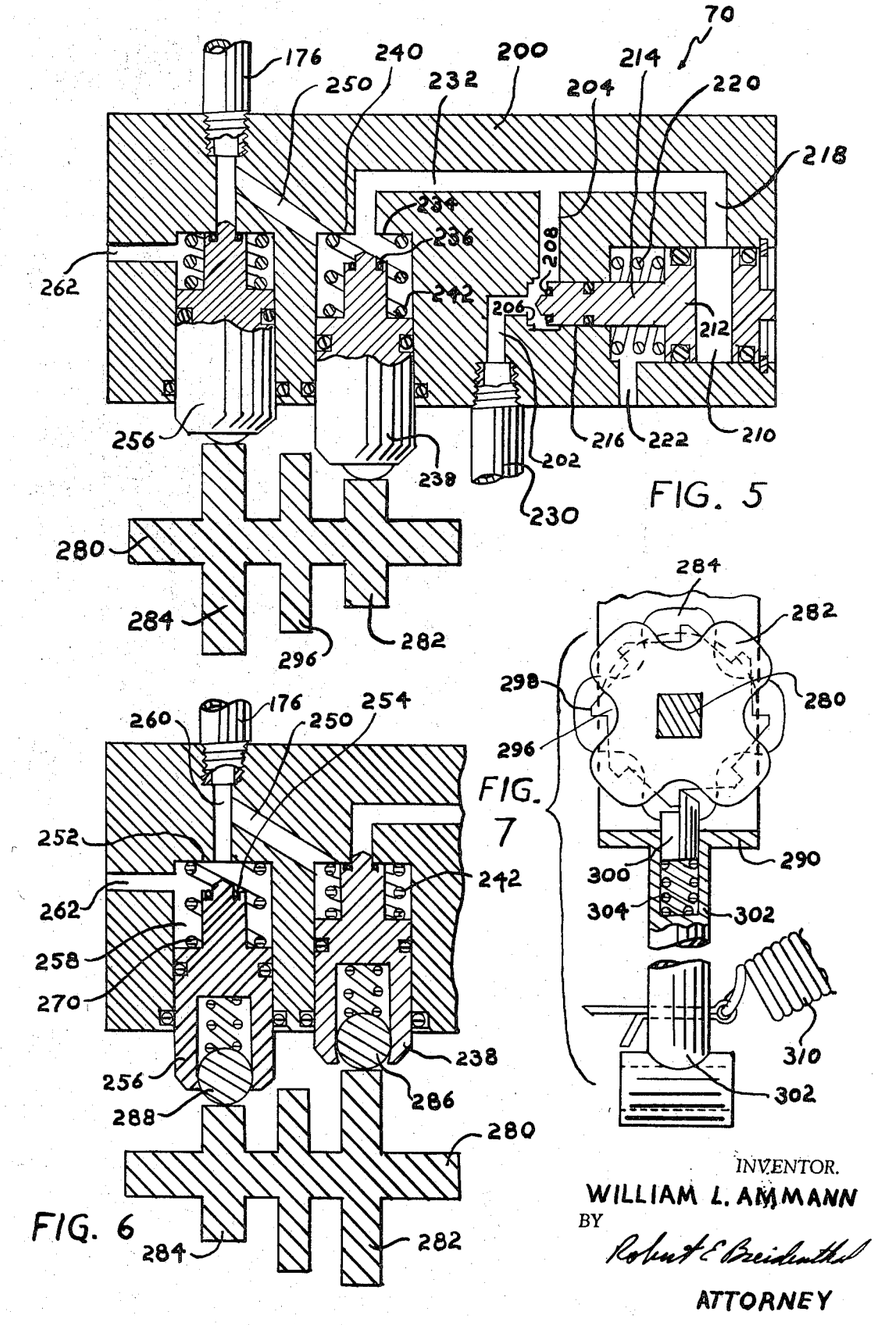
FIG. 5 is an enlarged central sectional view of the control means provided to actuate the plurality of individual valves such as the one shown in FIG. 2, this FIG. showing the structure in such condition as to cause opening of all the individual valves.
FIG. 6 is a fragmentary sectional view generally similar to FIG. 5; however, this view showing the structure in such a condition as to cause all the individual valves to close.
FIG. 7 is a broken view partially in section and with certain hidden details of structure shown in dashed outline of the means for operating the control structure shown in FIGS. 5 and 6.

By means subsequently described, the two valve elements 236 and 254 are alternately caused to make valve closing engagement with their respective annular valve seats. Such alternate positions or conditions of such valves are shown in FIGS. 5 and 6. When the valves are in the position shown thereof in FIG. 5, fluid pressure from the conduit 230, regulated as described, is introduced into the conduit 176, and the valving element 254 in engagement with its associated valve seat 252 prevents any loss of pressure within the conduit 176 to atmosphere through the opening 262. On the other hand, when the positions or conditions of the valves are such as shown in FIG. 6, the valving element 236 in engagement with its respective seat 234 prevents fluid in the passageway 232 from reaching the passageway 250 and consequently from reaching the conduit 176, but rather, the unseating of the valving element 254 from its associated valve seat 252 results in fluid pressure within the conduit 176 being vented to atmospheric pressure through the opening 262. The two valve structures associated with the valve stems 238 and 256 are quite similar as will be evident upon inspection of the drawings, wherein it will be noted that the chamber 258 is also provided with a coiled compression spring 270 generally similar to the previously described spring 242 in an arrangement such as to yieldingly urge opening of the valve controlled by the valve stem 256.

Accordingly, when the structure 70 is in the condition shown thereof in FIG. 5, fluid pressure from the top of the interior of the vessel 20 is applied to the valves 62 through 68 so as to open all such valves; however, when the condition of the structure of the control means 70 is such as indicated in FIG. 6, the pressure prevailing within the conduit 176 is vented to atmosphere with the result that all the valves 62 through 68 are closed in unison.

Attention is now directed to the means provided for interconnecting the valve stems 238 and 256 in such a manner that such valves are in alternate positions, that is, one valve is closed when the other is open, and whereby the reversal of such conditions can be manually brought about.

The means for interconnecting the valve stems 238 and 256 for alternate valve closure and also for manually reversing the condition of such valves comprises a shaft 280 on which are positioned a pair of cam wheels 282 and 284 for rotation therewith. As will be seen on consideration of FIG. 7, the lobes of such cam wheels 282 and 284 are alternated or interdigitated in angular positions circumferentially about the shaft 280, whereby when the shaft 280 is in an angular position such that one of the lobes of the cam wheel 284 is in engagement with the valve stem 256 so as to move the valve stem 256 into a position closing its associated valve, the valve stem 238 is in a position intermediate lobes of the cam wheel 282 with the result that the spring 242 opens the valve associated with the valve stem 238, such condition being shown in FIG. 5. Alternatively, as shown in FIG. 6, when the shaft 280 is turned through an angular rotation of 45°, a lobe of the cam wheel 282 engages the valve stem 238 so as to close the valve associated therewith, and the valve stem 256 is at an angular position intermediate lobes of the cam wheel 284 with the result being that the compression spring 270 opens the valve associated with the valve stem 256.

It will be noted that in order to minimize wear as between the valve stems 238 and 256 and the cam wheels 282 and 284 spring-pressed balls 286 and 288 are recessed within the exposed ends of the valve stems 238 and 256, respectively. Such spring-pressed balls also smooth the action of movement of the valve stems, allows for wear such as does occur, and quite importantly prevents the valving elements being seated with excess force.

In view of the foregoing, sequential successive steps of rotating the shaft 280 by angular increments of 45° results in successively reversing the condition of each valve with one of such valves being closed when the other is open. Rachet means is provided for manually effecting such successive increments of angular advance in toration of the shaft 280, such means comprising a U-shaped frame 290 journaled upon the same axis as the shaft 280, it being noted that the opposite ends of the shaft 280 are journaled for rotation at 292 in a pair of spaced ears or brackets 294 (see FIG. 1). Fixed to the shaft 280 at a position intermediate the cam wheels 282 and 284 is a rachet wheel 296 having rachet teeth 298 thereon that are angularly spaced from each other by 45°. A spring pressed rachet tooth 300 is mounted within an arm 302 fixed to the U-shaped frame 290, the arrangement being such that a coiled spring 304 yieldingly urges the rachet tooth into engagement with the teeth 298 of the rachet 296. As clearly shown in FIG. 7, clockwise angular movement of the arm 302 about the axis of the shaft 280 results in corresponding rotation of the rachet wheel 296 by virtue of the positive engagement between the rachet tooth 300 and one of the teeth 298; however, anticlockwise movement of the arm 302 does not result in rotation of the rachet wheel 296 and the shaft 280 because the rachet tooth 300 then rachets over the inclined rachet teeth 298. It will be appreciated that the shaft 280 unless positively forced into rotation tends to stay in either of the positions shown in FIGS. 5 and 6 for the reason that the outer ends of the cam lobes are relatively flat as compared to such camming surface existing between the lobes, and consequently the valve stems in their radial pressure against the cam wheels tend to retain the cam wheels in their present position. A coiled tension spring 310 (see FIG. 1) is attached in such a manner as to yieldingly urge the arm 302 into an anticlockwise direction of rotation and thereby cause the rachet tooth 300 to move into a position engaging an adjacent tooth 298, it being understood that the arm 302 is prevented by means not shown from moving more than slightly in excess of 45° by the spring 310. With the arm 302 and the rachet tooth 300 thus engaged with the next successive tooth 298, the operator may upon pulling from a remote position upon a rope or flexible tension element 316 cause by virtue of the attachment of the rope 316 to the outer end of the arm 302 clockwise movement of the arm 302 such as to result in the rachet tooth 300 forcibly turning the shaft 280 through an angle of 45°, and result in consequent reversal of the condition of the valves. After the operator has pulled upon the rope 316 to the extent necessary to effect the 45° increment of rotation (it being understood that means not shown prevent the arm 302 from being moved through a greater angle), the operator then releases the tension applied by him to the rope 216, whereupon the spring 310 moves the arm 302 into a position engaging the rachet tooth 300 with the next successive tooth.

The filter 38 (see FIG. 9) is comprised of a pair of conical members 320 and 322 having their major ends in abutment and peripherally secured by means of threaded fasteners 324. A circular screen 326 is provided, and the same being disposed within the housing defined by the conical members 320 and 322 to have its peripheral edge, which is embedded in an annular sealing member 328 seated between the major ends of the conical housing members 320 and 322, the minor ends of the conical housing members 320 and 322 being threadingly coupled to the conduits or lines 34 and 36 as shown in FIG. 9. The arrangement is such that the threaded fasteners 324 can be removed and the housing members 320 and 322 separated so that the filter screen 326 along with its sealing ring 328 can be cleaned and/or replaced, after which the filter 38 is reassembled and coupled to the conduits 34 and 36.

As clearly shown in FIGS. 10 and 11 with respect to the injector 54, which injector 54 is representative of and identical to the other injectors 56, 58 and 60, the same is comprised of a steel blade having an uppermost substantially straight portion 350 and a forwardly curved lower portion 352. As is conventional the forward edge 354 of the injector blade or knife 54 is sharpened throughout the vertical extent thereof. Also, the injector 54 is fixedly mounted on the frame 12 in such a manner that the upper straight portion 350 thereof is forwardly and downwardly inclined when the injector is in its ground penetrating position as shown in FIG. 1. The injector 54 differs from conventional injectors in that the same is provided with an opening throughout its longitudinal extent immediately adjacent the rear edge 356 thereof, such opening being indicated at 358 in FIG. 10 and being formed in the rear edge of the blade by the latter having initially been forged so as to have been spread or split laterally along the length of the rear edge of the blade, and the spread edges then being bent back and forced together at the lateral extremities thereof and welded together as at 360 to seal the seam resulting from such sequential forging and bending operations. Such mode of fabrication results in the formation of the opening 358. The entire lower end of the opening 358 is closed and welded to be fluid-tight, and thereafter small orifices or openings 362 are formed by drilling entirely through the lower end of the blade and the opening 358, with the result that the lateral openings 362 from the opening 358 are jointly of substantially reduced cross-sectional size as compared to the opening 358. In the use of apparatus 10, ammonia passed by the valve 62 is introduced by the conduit 132 into the opening 358 and such introduced ammonia passes to the lower end of the opening 358 after which it is discharged laterally to both sides of the injector 52 through the small openings or orifices 362. Similarly, ammonia introduced to the valve 64 by the conduit 48 passes from the valve 64 through a conduit 370 to the injector 56 to be discharged through the relatively small orifices 372 at the lower rear end of the injector 56.

The use of apparatus 10 will now be readily understood. The tank 10 is initially charged with liquid ammonia 22 through a conventional filling fitting, not shown, and the apparatus 10 is then pulled or towed through the field being treated with the injectors lowered into ground penetrating position (in a conventional manner and by conventional apparatus, not shown, which is well known in the art), it being understood that the valves 24 and 26 are open, and it also being understood that the arm 302 is actuated by applying tension to the rope 316 so as to place the structure of the control means 70 in the condition shown thereof in FIG. 5. In such condition, all the valves 62 through 68 are open and ammonia is injected into the ground at a position below the surface thereof. Upon the operator reaching a point such as it is necessary to make a turnaround, he jerks upon the rope 316 which results in venting the conduit 176 to the atmosphere and consequent closure in unison of all the valves 62 through 68. By jerking upon the rope the operator causes a very rapid reversal of the valves and prompt closure of the valves 62 through 68. The operator may then elevate the injectors 54 through 60 from ground penetrating position by conventional means, not shown. As soon as the operator has completed his turnaround and has reinserted or caused the injectors 54 through 60 to penetrate the surface of the ground, he again jerks upon the rope 316 with the result of all the valves 62 through 68 being promptly opened in unison and such procedure is carried on to completion of treatment of the field.

It is extremely important to note that all the valves 62 through 68 are positioned in very close proximity to the injectors 54 through with the result of very little ammonia being trapped between the valves 62 through 68 and the discharge orifices of the injectors when such valves are closed and consequently wasted to the atmosphere or in any event lost to the soil in an uneconomic and undesired fashion. It is also deemed noteworthy that actuation of all the valves 62 through 68 is accomplished through the use of pressurized ammonia vapor only, and that such operation is not dependent upon any other separately provided source of fluid power.

The use of the micrometerlike means for individually adjusting the extent that each individual valve of the valves 62 through 68 is opened coupled with the fact that the degree of opening of such valve is adjustable with precision enables uniform rates of injection as between the various injectors, and also this enables adjustment of injection such as to vary the concentration of the treatment of the field, that is, to control with a considerable degree of precision the number of pounds of ammonia injected per acre of land. For example, sometimes it is desired to treat with as little as 30 pounds of ammonia per acre, whereas sometimes it is desired to treat with 10 times this concentration. Then, too, the adjustment affords a means for compensating for the speed with which the apparatus is to be traversed over a field. The richness of application is of course also a function of the rate of advance of the vehicle and such rate of advance will be reasonably constant for a given field, towing vehicle, operator, and so forth; however, if such rate of advance is such as to be widely variable, it is contemplated that conventional means can be provided in the conduit 42 whereby a metering of the rate of flow of ammonia is effected in a manner dependent upon the rate of rotation of the ground support wheels 16 and 18, though this is not preferred as it is desired that the rate of discharge be based on the setting of the valves 62 and 68 and under conditions such that substantially solely liquid ammonia passes through such valves.

It is extremely important to note that each of the valves 62 through 68 constitute the major impediment to the flow of ammonia throughout the passage thereof from the pressure regulator 40 to the soil being treated. In other words the valves 62 through 68 constitute not only constrictions but the greatest constrictions in the cross-sectional flow area of the stream of ammonia throughout its passage from the pressure regulator 40 through the conduits, the valves and the injectors (including the discharge orifices of the latter), whereby the rate of flow of ammonia is predominantly dependent upon the constriction or reduction of available flow area established in an adjustable manner by the valves 62 through 68. The importance of the relatively reduced effective cross-sectional area of flow presented by the valve 62 resides not only in the fact that such relationship enables adjustment of the valve 62 to control fluid flow, but also in the fact that the ammonia can be maintained under a pressure during its entire passage from the pressure regulator 40 to the valve 62 such as to be maintained substantially entirely in a liquid state, it being evident that such passage involves by far the majority of the distance of travel of the ammonia from the pressure regulator to the injectors.

An extremely important advantage of minimizing evaporation of the ammonia prior to discharge through the injector orifices resides in the fact that excessively cold temperatures of the injectors is avoided, it being appreciated that excessively cold temperatures of the injector units results in freezing of the moisture in the soil in immediate contact with the injectors, and this in turn results in the building up of an adhering heavy layer or thick coating of frozen earth about the injectors such as to make it impossible to proceed.

Still another extremely important advantage resulting from keeping the ammonia at least mostly in the liquid state prior to discharge and substantially entirely in the liquid state to the valve 62 is that a substantial stability in mass flow rate is obtained. Introducing ammonia as substantially solely a liquid and at a constant pressure into a constriction results in a much more stable mass rate of flow than if a liquid including slugs of vapor were so introduced. Indeed, the mass flow rate is much more stable than if a vapor containing slugs or intermittent collections of liquid were introduced at a constant pressure.

A further advantage of maintaining the liquid phase insofar as is practically possible not only through the valve 62 but also through the injector 54 resides in the fact that such additional soil treating substances which may be dissolved in the liquid ammonia will not drop out of solution on evaporation of the ammonia and therefore will not tend to clog the valve 62, the injector 54, etc.

Although the apparatus 10 is obviously susceptible to other modes of operation such as by setting the output pressure of the regulator 40 to a low value such that substantial evaporation occurs in the conduit 42 (more or less in accordance with the proposals of others, it being observed that some of such other proposals even include the provision of means to facilitate such operation), the preferred method of operating apparatus 10 is to set the regulator 40 to about 40 p.s.i.g. (at least 35 p.s.i.g.) or more which will maintain the ammonia in substantially solely a liquid state to and through the valves 62 through 68, with the pressure in injectors 54 through 60 being in the range of about 4 to about 15 p.s.i.g. It has been found that with such pressure in the injectors will result, during the flow of ammonia therethrough, in only a small percentage of the ammonia evaporating while still within the injectors (such percentage ordinarily being substantially less than 10 percent), and in any event being so small in amount that the refrigeration effect of evaporation will not cause the adherence of frozen earth to the injectors.

Though not preferred and not necessary in order to realize the advantages previously discussed, the central concept of the method of this invention can be carried into practice in such a manner that no evaporation of ammonia occurs prior to discharge. For example, the discharge orifices 362 would be of such small size that an excessive rate of flow of liquid ammonia therethrough even when the pressure within the opening 358 is substantially in excess of the saturation pressure of ammonia at the temperature of the injector 54, and with the pressure regulator 40 being such as to introduce liquid ammonia into the conduit 42 at a still much higher pressure (sufficiently higher that the corresponding pressure drop across the valve 62 is greater than the pressure within the injector) whereby the rate of flow is controllable by the valve 62; such much higher pressure of introduction of liquid ammonia into the conduit 42 being effected if necessary by employing a pressure regulator 40 of the pump type having a constant pressure of discharge, whereby the pressure of introduction into the conduit can be regulated at a constant value that can exceed the pressure within the vessel 20.

In this extreme method of practicing the invention, the liquid ammonia would suffer a pressure drop (from the high level constant pressure) of adjustable magnitude on being passed through the variable constriction constituted by the valve 62, such pressure drop being substantially less (even for relatively low flow rates) than such as would reduce the pressure to the saturation pressure for temperature conditions prevailing about the injector 54, and thence the liquid ammonia under a pressure above the saturation pressure thereof would be expelled through the discharge orifices 362 as a liquid.

As stated above, such extreme mode of practicing the invention is not essential in the actual practice of the invention in order to obtain the advantages thereof to a very satisfactory degree. It is believed that such extreme mode of practicing the invention, while perhaps seeming to be quite a lot more desirable from the standpoint of theory or of a perfectionist as such would positively prohibit all evaporation of ammonia except after discharge from the injectors, is not nearly as superior as might be suspected over the described practical conditions of operation wherein the ammonia is under a pressure of about 4 to about 15 p.s.i.g. in the injector 52 for the reason that under the dynamic conditions of fluid flow through the injector results in less evaporation in the injector 54 than the pressure would seem to indicate to be likely. Undoubtedly, at least to some extent, such vaporization as may occur within the injector tends to suppress further vaporization in the cooling of remaining liquid and therefore reducing its saturation pressure. Such cooling or refrigeration as may occur in practice of the present method does not produce such a cold temperature as to cause (as often experienced in conventional methods wherein a large amount of vaporization occurs) the freezing and adherence of soil to the injector. Such small degree of cooling effect coupled with the heat of friction generated by movement of the injector through the soil prevents or adequately suppresses such adherence.

Needless to say, the method and apparatus of this invention can be extended to treating soil with other liquified, normally gaseous substances such as, for example, low molecular weight saturated and unsaturated hydrocarbons, such as butane and butene.

Both the method and the apparatus of this invention are subject to numerous variations in detail without departing from the spirit of the invention, and accordingly, attention is directed to the appended claims in order to ascertain the actual scope of the invention.

I claim:

1. In the method of treating soil with anhydrous ammonia, wherein a treating unit is caused to traverse a field, such treating unit including a vessel for containing liquid anhydrous ammonia and a soil penetrating injector having a passageway therethrough, such injector being remote from the vessel, and wherein ammonia is introduced from the vessel into an elongated conduit, passed through the conduit and introduced into the passageway of the injector from the conduit, thence passed through the passageway of the injector to be finally discharged from the injector into the soil below the surface of the latter; the improvement in such method comprising the steps of introducing the anhydrous ammonia into the conduit in the liquid state at a substantially constant pressure of about 40 p.s.i.g. pressure, and maintaining substantially the entirety of the ammonia within the conduit in its liquid state by passing the ammonia from the conduit through a flow rate controlling valving constriction immediately prior to introducing the ammonia into the inlet end of the passageway of the injector, while throttling the discharge of ammonia from the discharge end of the passageway, with the valving constriction being such that a pressure of between about 4 and about 15 p.s.i.g. pressure is maintained in the passageway, whereby essentially no vaporization of the ammonia takes place during passage through the conduit and little, if any, during passage through the injector.

2. The method of claim 1, wherein the flow of ammonia is discontinued by completely closing the valving constriction, whereby ammonia in the conduit is precluded from entering the passageway of the injector.

3. The method of claim 1, wherein the flow rate of the ammonia is changed by changing the amount of the constriction of the valving constriction.